(12) United States Patent
Chen

(10) Patent No.: US 12,233,341 B2
(45) Date of Patent: Feb. 25, 2025

(54) GAME SCENE EDITING METHOD, STORAGE MEDIUM, AND ELECTRONIC DEVICE

(71) Applicant: NETEASE (HANGZHOU) NETWORK CO.,LTD., Zhejiang (CN)

(72) Inventor: Jiahao Chen, Zhejiang (CN)

(73) Assignee: NETEASE (HANGZHOU) NETWORK CO., LTD., Zhejiang (CN)

( * ) Notice: Subject to any disclaimer, the term of this patent is extended or adjusted under 35 U.S.C. 154(b) by 174 days.

(21) Appl. No.: 17/778,046

(22) PCT Filed: Apr. 15, 2021

(86) PCT No.: PCT/CN2021/087432
§ 371 (c)(1),
(2) Date: May 19, 2022

(87) PCT Pub. No.: WO2021/249018
PCT Pub. Date: Dec. 16, 2021

(65) Prior Publication Data
US 2022/0410010 A1 Dec. 29, 2022

(30) Foreign Application Priority Data
Jun. 9, 2020 (CN) .......... 202010519399.X

(51) Int. Cl.
*A63F 13/63* (2014.01)
*A63F 13/5252* (2014.01)

(52) U.S. Cl.
CPC .......... *A63F 13/63* (2014.09); *A63F 13/5252* (2014.09); *A63F 2300/6009* (2013.01); *A63F 2300/6018* (2013.01)

(58) Field of Classification Search
CPC ...... A63F 13/63; A63F 13/5252; A63F 13/60; A63F 2300/60; A63F 2300/6009; A63F 2300/6018
USPC .......................................................... 463/42
See application file for complete search history.

(56) References Cited

U.S. PATENT DOCUMENTS

| 8,531,452 B2* | 9/2013 | Inoue ............... H04N 13/398 345/419 |
| 8,764,564 B2* | 7/2014 | Shikata ............... A63F 13/428 463/31 |
| 9,517,413 B1 | 12/2016 | Wickett et al. |
| 2017/0165579 A1 | 6/2017 | Wickett et al. |

(Continued)

FOREIGN PATENT DOCUMENTS

| CN | 1866264 A | 11/2006 |
| CN | 1896985 A | 1/2007 |
| CN | 1945588 A | 4/2007 |

(Continued)

*Primary Examiner* — Allen Chan
(74) *Attorney, Agent, or Firm* — Qinghong Xu

(57) ABSTRACT

A game scene editing method, a storage medium, and an electronic device are disclosed. The editing method includes: scene editing information sent by a first client is acquired; first scene data of a first game scene is modified based on the scene editing information to obtain second scene data for updating the first game scene into a second game scene; and the second scene data is sent to the first client and a second client, to enable the first client and the second client to display the second game scene.

20 Claims, 5 Drawing Sheets

(56) References Cited

U.S. PATENT DOCUMENTS

2018/0326302 A1* 11/2018 Tsutsui .................. A63F 13/837
2018/0353860 A1* 12/2018 Nakamura .............. A63F 13/31

FOREIGN PATENT DOCUMENTS

| | | |
|---|---|---|
| CN | 101694615 A | 4/2010 |
| CN | 101772366 A | 7/2010 |
| CN | 102262534 A | 11/2011 |
| CN | 106991713 A | 7/2017 |
| CN | 107222510 A | 9/2017 |
| CN | 107291427 A | 10/2017 |
| CN | 107485856 A | 12/2017 |
| CN | 107684721 A | 2/2018 |
| CN | 107959687 A | 4/2018 |
| CN | 108053174 A | 5/2018 |
| CN | 108595101 A | 9/2018 |
| CN | 109091861 A | 12/2018 |
| CN | 109550237 A | 4/2019 |
| CN | 109675307 A | 4/2019 |
| CN | 110420460 A | 11/2019 |
| CN | 110639206 A | 1/2020 |
| CN | 111569426 A | 8/2020 |
| JP | 2013219549 A | 10/2013 |
| KR | 20160014808 A | 2/2016 |

\* cited by examiner

GAME SCENE EDITING METHOD, STORAGE MEDIUM, AND ELECTRONIC DEVICE

CROSS-REFERENCE TO RELATED APPLICATION

The present disclosure claims priority of Chinese patent application No. 202010519399.X, filed on Jun. 9, 2020 and entitled after "Game Scene Editing Method and Apparatus, Storage Medium, and Electronic Device". Contents of the present disclosure are hereby incorporated by reference in its entirety of the Chinese Patent Application.

TECHNICAL FIELD

The present disclosure relates to the field of computers, and in particular, to a game scene editing method, a storage medium, and an electronic device.

BACKGROUND

At present, when a game scene in a game engine is edited, if multiple clients edit at the same time, a resource conflict problem occurs. Thus, for a development of the game scene, only one client is allowed to edit at the same time. It is generally to set a sequence to edit the game scene in series, wherein when one client finishes editing the game scene and the other client can continue editing the game scene.

SUMMARY

A main object of the present disclosure is to provide a game scene editing method, a storage medium, and an electronic device.

According to one aspect of the embodiments of the present disclosure, a game scene editing method is provided, which may include: scene editing information sent by a first client is acquired; first scene data of a first game scene is modified based on the scene editing information to obtain second scene data, wherein the second scene data is used for updating the first game scene into a second game scene; and the second scene data is sent to the first client and a second client, to enable the first client and the second client to display the second game scene.

According to another aspect of the embodiments of the present disclosure, another game scene editing method is also provided, which may include: a first client edits a first game scene and sends the scene editing information to a server, wherein the scene editing information is used for enabling the server to modify first scene data of the first game scene to obtain second scene data and send the second scene data to at least one client, wherein the at least one client includes the first client and a second client, and the second scene data is used for updating the first game scene into a second game scene; and the first client receives the second scene data sent by the server, and updates the displayed first game scene into a second game scene based on the second scene data.

According to another aspect of the embodiments of the present disclosure, a game scene editing apparatus is provided, which may included: at least one processor, and at least one memory for storing a program element, wherein the program element is executed by the processor and may include: an acquisition component, configured to acquire scene editing information sent by a first client; an editing component, configured to modify first scene data of a first game scene based on the scene editing information to obtain second scene data for updating the first game scene into a second game scene; and a first sending component, configured to send the second scene data to the first client and a second client, to enable the first client and the second client to display the second game scene.

According to another aspect of the embodiments of the present disclosure, a game scene editing apparatus is also provided, which may included: at least one processor, and at least one memory for storing a program element, wherein the program element is executed by the processor and may include: a second sending component, configured to enable a first client to edit a first game scene and send scene editing information to a server, wherein the scene editing information is used for enabling the server to modify first scene data of the first game scene to obtain second scene data and send the second scene data to at least one client, wherein the at least one client includes the first client and a second client, and the second scene data being used for updating the first game scene into a second game scene; and a receiving component, configured to enable the first client to receive the second scene data sent by the server, and update the displayed first game scene into a second game scene based on the second scene data.

According to another aspect of the present disclosure, a non-transitory storage medium is provided. A computer program is stored in the non-transitory storage medium. A device where the non-transitory storage medium is located is controlled to perform following steps when the computer program is executed by a processor: a first game scene is editing and the scene editing information is sent to a server, wherein the scene editing information is used for enabling the server to modify first scene data of the first game scene to obtain second scene data and send the second scene data to at least one client, and the second scene data is used for updating the first game scene into a second game scene; and the second scene data sent by the server is received, and the displayed first game scene is updated into a second game scene based on the second scene data.

According to another aspect of the present disclosure, an electronic device is provided. The electronic device includes a processor and a memory. The memory is connected to the processor and configured to store a computer program, and the processor is configured to execute the computer program to perform the following steps: a first game scene is editing and the scene editing information is sent to a server, wherein the scene editing information is used for enabling the server to modify first scene data of the first game scene to obtain second scene data and send the second scene data to at least one client, and the second scene data is used for updating the first game scene into a second game scene; and the second scene data sent by the server is received, and the displayed first game scene is updated into a second game scene based on the second scene data.

DETAILED DESCRIPTION OF THE EMBODIMENTS

Figure 1:
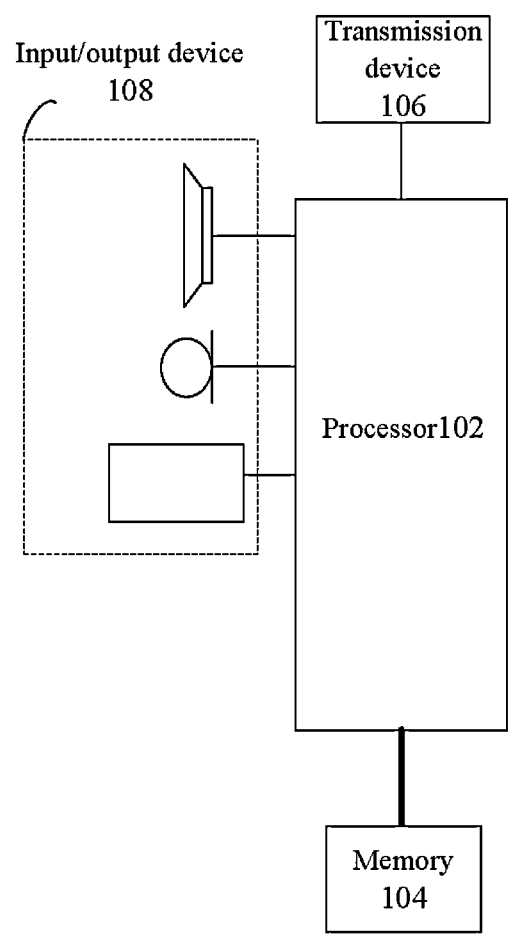
FIG. 1 is a block diagram illustrating a hardware structure of a mobile terminal of a game scene editing method according to one embodiment of the present disclosure.

It should be noted that embodiments in the present application and characteristics in the embodiments may be combined under the condition of no conflicts. The present disclosure is described below with reference to the drawings and in conjunction with the embodiments in detail.

In order to make those skilled in the art better understand the solutions of the present application, the technical solutions in the embodiments of the present application will be clearly and completely described below with reference to the drawings in the embodiments of the present application. It is apparent that the described embodiments are only a part of the embodiments of the present application, not all of the embodiments. All other embodiments obtained by those of ordinary skill in the art based on the embodiments of the present application without creative efforts should fall within the scope of protection of the present application.

It should be noted that the specification and claims of the present application and the terms "first", "second" and the like in the drawings are used for distinguishing similar objects, and do not need to describe a specific sequence or a precedence order. It will be appreciated that data used in such a way may be exchanged under appropriate conditions, in order that the embodiments of the present application described here can be implemented. In addition, terms "include" and "have" and any variations thereof are intended to cover non-exclusive inclusions. For example, it is not limited for processes, methods, systems, products or devices containing a series of steps or components to clearly list those steps or components, and other steps or components which are not clearly listed or are inherent to these processes, methods, products or devices may be included instead.

The method embodiment provided by the embodiments of the present application may be implemented in a mobile terminal, a computer terminal or a similar computing device. Taking operation on a mobile terminal as an example, FIG. 1 is a block diagram illustrating a hardware structure of a mobile terminal of a game scene editing method according to one embodiment of the present disclosure. As shown in FIG. 1, the mobile terminal may include at least one (only one is shown in FIG. 1) processor 102 (the processor 102 may include but is not limited to a processing apparatus such as a Micro Controller Unit (MCU) or a Field Programmable Gate Array (FPGA)) and at least one memory 104 for storing data. Optionally, the above mobile terminal may further include a transmission device 106 and an input/output device 108 for communication functions. Those skilled in the art can understand that the structure shown in FIG. 1 is merely illustrative, and does not limit the structure of the above mobile terminal. For example, the mobile terminal may also include more or fewer components than shown in FIG. 1, or has a different configuration from that shown in FIG. 1.

The memory 104 may be configured to store a computer program, for example, a software program and module of application software, such as a computer program corresponding to a data processing method in the embodiment of the present disclosure, and the processor 102 executes various functional applications and data processing by running the computer program stored in the memory 104, that is, implements the above method. The memory 104 may include a high speed random access memory and may also include a non-transitory memory such as at least one magnetic storage device, a flash memory, or other non-transitory solid state memory. In some examples, the memory 104 may further include memory remotely located relative to the processor 102, which may be connected to the mobile terminal over a network. The examples of such networks include, but are not limited to, the Internet, the Intranet, local area networks, mobile communication networks, and combinations thereof.

The transmission device 106 is configured to receive or send data via a network. The above specific network example may include a wireless network provided by a communication provider of the mobile terminal. In one example, the transmission device 106 includes a Network Interface Controller (NIC) that may be connected to other network devices through a base station to communicate with the Internet. In one example, the transmission device 106 may be a Radio Frequency (RF) module for communicating with the Internet wirelessly.

Figure 2:
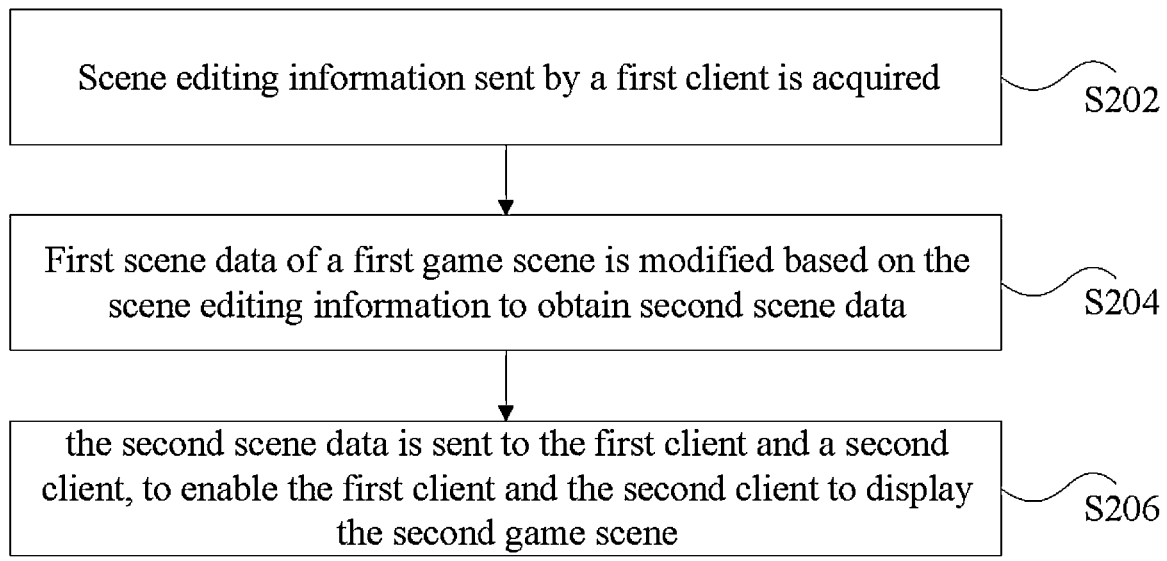
FIG. 2 is a flowchart of a game scene editing method according to one embodiment of the present disclosure.

The game scene editing method in the present embodiment is described below from a server side. FIG. 2 is a flowchart of a game scene editing method according to one embodiment of the present disclosure. As shown in FIG. 2, the editing method may include the following steps.

At step S202, scene editing information sent by a first client is acquired.

In the technical solution provided by the step S202 of the present disclosure, in a game editing scene, the first client is a client editing a current first game scene in a game scene development process, may be a client used by at least one worker who is editing the first game scene, and may be called a scene editor. The at least one worker may include multiple artists or planners.

A communication connection is established between the server in the present embodiment and the first client, the scene editing information sent by the first client may be acquired by the server, and the scene editing information is used for editing the first game scene. Optionally, the scene editing information may include operation information and editing contents, etc. when the first client performs an editing operation on the first game scene.

At step S204, first scene data of a first game scene is modified based on the scene editing information to obtain second scene data.

In the technical solution provided by the step S204 of the present disclosure, after the scene editing information sent by the first client is acquired, first scene data of a first game scene is modified based on the scene editing information to obtain second scene data, wherein the second scene data is used for updating the first game scene into a second game scene.

In the present embodiment, the server acquires first scene data of the first game scene, which is used for generating the first game scene and may include, but is not limited to, at least one terrain parameter, at least one light direction parameter, at least one light intensity parameter, at least one model parameter, at least one baking parameters, etc. in the first game scene. The server modifies the first scene data through the scene editing information, and determines the first scene data modified as second scene data to update the first game scene through the second scene data so as to obtain a second game scene.

At step S206, the second scene data is sent to the first client and a second client, to enable the first client and the second client to display the second game scene.

In the technical solution provided by the step S206 of the present disclosure, after the first scene data of the first game scene is modified based on the scene editing information to obtain the second scene data, the server may send the second scene data to the first client and a second client, to enable the first client and the second client display the second game scene.

In the present embodiment, the server may distribute the second scene data to the first client and the second client. The second client may be other client for editing the game scene. Optionally, the first client and the second client of the present embodiment may uniformly display the first game scene before receiving the second scene data. After the first client and the second client receiving the second scene data, a second game scene is generated through the second scene data and the originally displayed first game scene is updated into the second game scene by the first client and the second client. At this moment, both the first client and the second client display the second game scene, so that both the first client and the second client may display the latest editing result of a game scene development project. That is to say, a specific performance of each client is ensured to be consistent, each worker can see the latest editing progress of the game scene development project, and a working content of editing the game scene is adjusted based on the latest editing progress.

In the present embodiment, any client for editing the game scene may edit a current game scene at any time to generate the scene editing information, the server may modify scene data of the current game scene under the condition of receiving the scene editing information to obtain scene data modified, and then distribute the scene data modified to all the clients for editing the game scene, and a new game scene generated by the scene data modified is displayed by all the clients, so that the purpose that multiple clients edit one game scene at the same time within a certain time is achieved, and time wasted for waiting by editing the game scene in series is avoided.

It should be noted that the first game scene of the present embodiment is not only directed to the first client, and that each client for editing the game scene may present the first game scene.

In the game scene editing method of the related art, the game scene is generally divided into multiple sub-areas, each client edits one of the sub-areas, and finally the sub-areas edited are merged to form a complete game scene. However, the editing method seems to enable multiple clients to edit a game scene at the same time, actually sub-areas required to be edited by the multiple clients are divided, and one client cannot display editing results of the other client in real time so as to adjust work of the client. The method above is equivalent to dividing a large game scene into multiple small scenes, and finally merging the multiple small scenes. Problems are easy to occur in a process of merging the multiple small scenes, and a merging operation is implemented differently on different game engines, so that the editing efficiency of the game scene is affected, and many new problems are encountered when the current game scene is repeatedly modified, thereby further leading to a technical problem of the inefficiency in game editing.

However, in the game scene editing method of the present application, through steps S202 to S206, scene editing information sent by a first client is acquired; first scene data of a first game scene is modified based on the scene editing information to obtain second scene data, wherein the second scene data is used for updating the first game scene into a second game scene; and the second scene data is sent to the first client and a second client, to enable the first client and the second client to display the second game scene. That is to say, the client of the present embodiment synchronizes the scene editing information to the server to modify the scene data of the game scene, and then multiple clients editing the game scene may receive the scene data modified distributed by the server, so that each client is ensured to present the latest game scene at present, the purpose of simultaneously editing the same game scene by multiple people is achieved, time wasted for waiting by editing the game scene in series is avoided, and the problem that the game scene is divided into multiple sub-areas which easily causes merging errors and lack of non-timely communication is also avoided, thereby the technical problem of low efficiency of editing the game scene is solved, and the technical effect of improving the efficiency of editing the game scene is achieved.

The above method of the present embodiment is further described below.

As an optional implementation method, the scene editing information is obtained through computing, by the first client, object data in the first game scene.

In the game scene editing of the present embodiment, a frame synchronization technology may be adopted to perform logic and calculation on the object data in the first game scene on the first client to obtain the scene editing information, and the server acquires the scene editing information computed and uploaded by the first client to modify the first scene data of the first game scene to obtain the second scene data. The object data may be data used in calculating at least one physical collision with at least one object in the first game scene.

It should be noted that areas on why the present embodiment adopts the frame synchronization technology instead of a state synchronization technology for game scene editing is that there are many calculations related to the at least one physical collision during the editing operation of the first game scene, and these calculations are relatively large. If these calculations of each client are directly put to the server, a computing pressure of the server is very large. There is also a relatively large delay, therefore the at least one physical collision related calculations is put on the client can avoid the server from being computationally stressful and having a small delay to improve the efficiency of editing the game scene.

As an optional implementation method, before the scene editing information sent by the first client is acquired at step S202, the editing method further includes the following steps: position information of a virtual camera corresponding to the first client is acquired; the position information of the virtual camera corresponding to the first client is sent to the second client, to enable a position of the virtual camera corresponding to the second client to be adjusted to be consistent with a position of the virtual camera corresponding to the first client, wherein a game scene presented by each client is a game scene screen captured by the virtual camera corresponding to each client.

In the present embodiment, in the editing mode of the first client, a virtual camera is provided, the server may acquire position information of the virtual camera corresponding to the first client. The position information determines the game scene screen presented by the first client through the virtual camera, which may be a game scene screen under different perspectives, and includes displacement rotation information and view cone information. The game scene screen includes content required to be edited by the first client.

For example, the first client is client A for presenting a top view angle, and a game scene screen under the top view angle includes a game scene required to be edited by the client A. The first client is client B for presenting a left view angle, and a game scene screen under the left view angle includes a game scene required to be edited by the client B. The first client is client C for presenting a right view angle, and a game scene screen in the right view angle includes a game scene required to be edited by the client C.

After the server acquires the position information of the virtual camera corresponding to the first client, the position information of the virtual camera corresponding to the first client may be synchronized to the second client through a network synchronization function, and the second client adjusts the position of the virtual camera corresponding the second client to be consistent with the position of the virtual camera corresponding to the first client, so that the second client may display the first game scene of the first client under a corresponding perspective through the position information, and an editing progress of the first client to the game scene development project may be determined in real time to adjust the working content of the second client to the game scene development project, thereby the editing efficiency of the game scene is improved.

As an optional implementation method, before the scene editing information sent by a first client At step S202 is acquired, the editing method further includes the following steps: state information of each object in a current game scene of the first client is acquired; the state information of each object in the current game scene of the first client is synchronized to the second client.

In the present embodiment, the current game scene of the first client includes multiple objects, which may be objects in the current game scene. Before the scene editing information sent by the first client is acquired, the server may acquire the state information of each object in the current game scene of the first client. For example, displacement rotation scaling information of each object in the current game scene is acquired and synchronized to the second client, so that the state of the object in the first game scene presented by the second client are consistent with the state of the object in the first game scene presented by the first client.

As an optional implementation method, after the first scene data of a first game scene based on the scene editing information to obtain second scene data is modified at step S204, the editing method further includes the following step: the second scene data is backed up.

In the present embodiment, after the server modifies the first scene data of the first game scene based on the scene editing information to obtain the second scene data, the server may also back up the second scene data in order to avoid a loss of the second scene data. Optionally, a certain timing time is set, and the server of the present embodiment may back up the second scene data according to the timing time for later query.

It should be noted that the second scene data is backed up on the same server in the present embodiment to ensure that the second scene data to be acquired by each client is consistent.

As an optional implementation method, after the second scene data is sent to the first client and the second client at step S206, the editing method further includes the following steps: in response to that the first client updates the second game scene into a third game scene, the backed-up second scene data is sent to the first client and the second client in response to a scene recovery request, to enable the first client and the second client to update the currently displayed third game scene into the second game scene.

In the present embodiment, under the condition that the second game scene is updated into the third game scene, for example, the server acquires the scene editing information sent by the first client (or other clients), and modifies the second scene data of the second game scene based on the scene editing information to obtain third scene data. The third scene data is used for updating the second game scene into a third game scene. The server sends the third scene data to the first client and the second client so that the first client and the second client display the third game scene, but this may be a result of the second game scene updated into the third game scene due to inadvertent operation on the first client. Since the server in the present embodiment has backed up the second scene data, under the condition that the server receives the scene recovery request sent by the client, the server may send the backed-up second scene data to the first client and the second client in response to the scene recovery request, so that the first client and the second client may restore and display the second game scene based on the backed-up second scene data. Thus, the situation that an edited game scenes are completely deleted or the edited game scenes from another person are accidentally covered due to careless operation on some other clients is avoided, so that the editing efficiency of the game scene can be improved.

As an optional implementation method, the scene editing information is sent by the first client under a target editing mode.

In the game scene editing method of the preset embodiment, the first client may be in a target editing mode, and the scene editing information received by the server may be sent by the clients in different target editing modes. The target editing mode may be used for indicating an authority of each client to edit functions of the game scene.

As an optional implementation method, the target editing mode includes at least one of the following: a short-range editing mode, used for editing at least one object in the first game scene distant from a virtual camera corresponding to the first client less than a preset first distance; a long-range editing mode, used for editing at least one object in the first game scene distant from a virtual camera corresponding to the first client less than a preset second distance, wherein the preset second distance is greater than the preset first distance; and a global parameter editing mode, used for editing at least one global parameter of the first game scene. The following is exemplified by the first client.

In the present embodiment, the target editing mode set by the first client includes a short-range editing mode, a long-range editing mode, and a global parameter editing mode. When the first client is in the short-range editing mode, the first client may edit the at least one object distant from a corresponding virtual camera by less than a preset first distance in the first game scene. A distance from the corresponding virtual camera less than the preset first distance is a distance away from a vicinity in a view cone of the virtual camera corresponding to the first client. For example, the first client may edit the at least one object within a certain distance in the vicinity of the view cone to generate the scene editing information. When the first client is in the long-range editing mode, the first client may edit the at least one object distant from a corresponding virtual camera less than a preset second distance in the first game scene, so as to generate the scene editing information. A distance from the corresponding virtual camera less than the preset second distance is a distance away from the view cone of the virtual camera corresponding to the first client. For example, the first client may edit at least one long-range object such as a sky box of a remote scene which can be seen, so as to generate the scene editing information. It should be noted that the long-range editing mode of the present embodiment is not only capable of editing at least one remote object, but also capable of editing at least one long-range object in addition to at least one short-range objects. When the first client is in the global parameter editing mode, the first client may edit the at least one global parameter of the first game scene, so as to generate the scene editing information, and the first client may modify at least one variable of the at least one global parameter of the game scene in the process of editing the game scene, such as a light direction, an intensity of light, and at least one global baking parameter of the game scene.

Optionally, the first client in the present embodiment may freely switch the target editing mode at will, thereby the flexibility of editing the game scene is improved.

Optionally, the first client in the present embodiment may also have a browsing mode. In the browsing mode, the first client cannot edit any object in the game scene, but the first client may acquire position information of virtual cameras of other clients synchronized by the server, and may display the first game scene of the other clients under the corresponding perspective, so that the editing operation of the other clients can be seen, and a worker can conveniently refer to and learn the game scene edited by other people through the client or methods and skills used for editing the game scene, thereby a foundation for subsequent editing of the game scene is lay, and the efficiency of editing the game scene is improved.

It should be noted that in editing the game scene in the present embodiment, the above target editing mode has different types because each client edits the game scene differently in content and points of interest, each client uses different modes when editing the game scene, and conflicting operations can be avoided without affecting development efficiency.

As an optional implementation method, the editing method further includes the following steps: voice information sent by the first client is acquired; the voice information is synchronized to the second client.

In the game scene editing of the present embodiment, a voice call function may also be introduced. Optionally, the server acquires the voice information sent by the first client. The voice information may be information related to editing of the game scene. The server synchronizes the voice information to the second client so that the second client receives the voice information. Therefore, each client not only can edit the game scene at the same time, but also can communicate with other clients in real time, thereby the development efficiency of the game scene is further improved, and a risk of conflict of the game scene is reduced in the development process.

The game scene editing method according to the embodiment of the present disclosure is described below from a client side.

Figure 3:
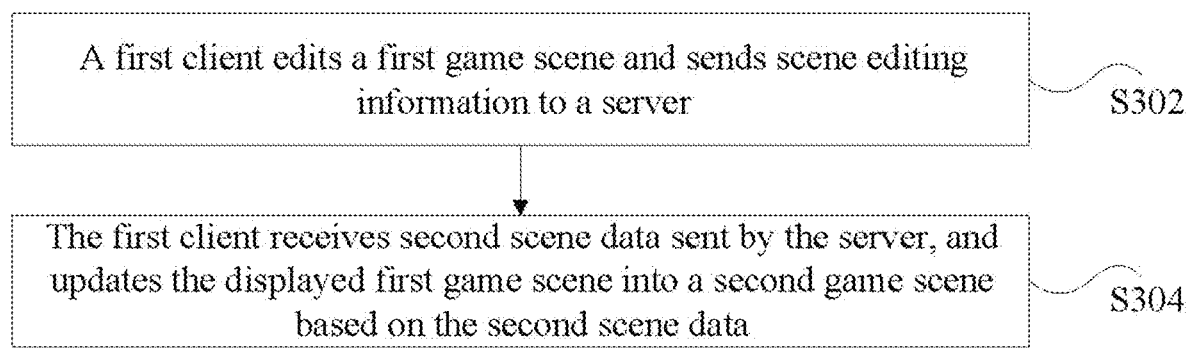
FIG. 3 is a flowchart of another game scene editing method according to one embodiment of the present disclosure.

FIG. 3 is a flowchart of another game scene editing method according to one embodiment of the present disclosure. As shown in FIG. 3, the editing method may include the following steps.

At step S302, a first client edits a first game scene and sends scene editing information to a server.

In the technical solution provided by the step S302 of the present disclosure, the scene editing information is used for enabling the server to modify first scene data of the first game scene to obtain second scene data and send the second scene data to at least one client, wherein the at least one client includes the first client and a second client, and the second scene data is used for updating the first game scene into a second game scene.

The first client in the present embodiment establishes a communication connection with the server, and may send scene the editing information to the server. Optionally, the scene editing information includes operation information and editing contents, etc. of the first client when an editing operation on the first game scene is performed. The scene editing information is used for enabling the server to edit the first game scene, and the server may modify the first scene data of the first game scene to obtain second scene data. The first scene data is data for generating the first game scene and may include, but is not limited to, at least one terrain parameter, at least one light direction parameter, at least one light intensity parameter, at least one model parameter, at least one baking parameter, etc. The second scene data may be used for generating the second game scene. The second scene data may be sent by the server to at least one client including the first client and the second client.

At step S304, the first client receives second scene data sent by the server, and updates the displayed first game scene into a second game scene based on the second scene data.

In the technical solution provided by the step S304 of the present disclosure, after the first client edits the first game scene and sends the scene editing information to the server, the first client receives second scene data sent by the server, and updates the displayed first game scene into a second game scene based on the second scene data.

The second scene data is sent to the first client and the second client by the server, so that the first client and the second client update the displayed first game scene into the second game scene.

In the present embodiment, the second client may be other clients except the first client in all the clients for editing the game scene, and the first client and the second client may acquire the second scene data sent by the server and update the displayed first game scene into the second game scene based on the second scene data. At this moment, both the first client and the second client display the second game scene, so that both the first client and the second client may display the latest editing result of the game scene development project. That is, the specific performance of each client is ensured to be consistent, each worker can see the latest editing progress of the game scene development project, and the working content of the worker is adjusted based on the latest editing progress.

In the present embodiment, the first client and the second client may edit the first game scene at any time to generate the scene editing information, which enables the server to modify the first scene data of the first game scene to obtain the second scene data, and the second client receives the second scene data distributed by the server and displays the second game scene, so that the purpose that multiple clients edit one game scene at the same time within a certain time is achieved, and time wasted for waiting by editing the game scene in series is avoided.

In the present application, through steps S302 and S304, the first client edits a first game scene and sends scene editing information obtained by the first client to the server. The scene editing information is used for enabling the server to modify first scene data of the first game scene to obtain second scene data and send the second scene data to at least one client, wherein the at least one client includes the first client and a second client, and the second scene data is used for updating the first game scene into a second game scene. The first client receives the second scene data sent by the server, and updates the displayed first game scene into a second game scene based on the second scene data. That is to say, the server in the present embodiment acquires the scene editing information synchronized by the first client, modifies the scene data of the game scene, and then distributes the scene data modified to the first client and the second client which edit the game scene, so that each client is ensured to present the latest game scene at present, the purpose of simultaneously editing the same scene by multiple people is achieved, time wasted for waiting by editing the game scene in series is avoided, and the problem that the game scene is divided into multiple sub-areas which easily causes merging errors and lack of non-timely communication is also avoided, thereby the technical problem of low efficiency of editing the game scene is solved, and the technical effect of improving the efficiency of editing the game scene is achieved.

The above method of the present embodiment is further described below.

As an optional implementation method, the first client edits the first game scene at the step S302 includes: the first client computes object data in the first game scene to obtain the scene editing information.

In the game scene editing in the present embodiment, a frame synchronization technology is adopted to perform logic and calculation on the object data in the first game scene by the first client, and the scene editing information computed is uploaded to the server, so that the server acquires the scene editing information computed to further modify the first scene data of the first game scene to obtain the second scene data. The object data may be data used by the first client in calculating at least one physical collision with at least one object in the first game scene.

As an optional implementation method, before the first client sends the scene editing information to the server at step S302, the editing method further includes the following steps: the first client sends position information of a corresponding virtual camera to the server, to enable the server to synchronize the position information of the virtual camera corresponding to the first client to the second client, so that the second client adjusts a position of the virtual camera corresponding to the second client to be consistent with a position of the virtual camera corresponding to the first client, wherein a game scene presented by each of the at least one client is a game scene screen captured by the virtual camera corresponding to each of the at least one client.

In the present embodiment, the game scene presented by the first client is a game scene screen captured by a virtual camera corresponding to the first client, and the game scene presented by the second client is a game scene screen captured by a virtual camera corresponding to the second client. The following is described with the first client. The virtual camera corresponding to the first client is configured to capture a game scene screen under a corresponding perspective and present the game scene screen on the first client, and the game scene screen under the perspective includes content required to be edited by the first client. For example, the virtual camera corresponding to the first client is configured to present a game scene screen corresponding to the first client in a top view perspective, and the game scene screen in the top view perspective includes content required to be edited by the client. The virtual camera corresponding to the first client is configured to present a game scene screen corresponding to the first client in a left view perspective, and the game scene screen in the left view perspective includes a game scene screen required to be edited by the first client. The virtual camera corresponding to the first client is configured to present a game scene screen corresponding to the first client in a right view perspective, and the game scene screen in the right view perspective includes content required to be edited by the client.

The first client of the present embodiment may send the position information of the virtual camera corresponding to the first client to the server, and the server further synchronizes the position information to the second client, so that the second client adjusts the position of the virtual camera corresponding to the second client to be consistent with the position of the virtual camera corresponding to the first client. Therefore, the second client may display the game scene screen of the first client under a corresponding perspective through the position information of the virtual camera corresponding to the first client, and the editing progress of the first client to the game scene development project may be determined in real time to adjust the working content of the second client to the game scene development project, thereby the editing efficiency of the game scene improved.

As an optional implementation method, after the first client receives the second scene data sent by the server and updates the displayed first game scene into the second game scene based on the second scene data at the step S304, the editing method further includes the following steps: in response to that the first client updates the second game scene into a third game scene, a scene recovery request is sent to the server. The scene recovery request is used for requesting to acquire the backed-up second scene data by the server. The first client receives the second scene data sent by the server, and updates the displayed third game scene into the second game scene based on the second scene data.

In the present embodiment, in order to avoid a loss of the second scene data, the second scene data may be periodically backed up in the server. In the present embodiment, under the condition that the second game scene is updated into the third game scene, for example, the first client (or other clients) sends the scene editing information to the server, so that the server edits the second scene data of the second game scene based on the scene editing information to obtain third scene data, the first client and the second client acquire the third scene data sent by the server, and the originally displayed second game scene is updated into the third game scene, but this may be a result of the second game scene updated into the third game scene due to inadvertent operation of the first client. Since the server has backed up the second scene data, under the condition that the client sends a scene recovery request to the server, the first client and the second client may acquire the backed up second scene data sent by the server in response to the scene recovery request, so that the first client and the second client may restore and display the second game scene. Thus, the situation that an edited game scene are completely deleted or the edited game scene form another person are accidentally covered due to careless operation on some other clients is avoided, so that the editing efficiency of the game scene can be improved.

As an optional implementation method, the first client edits the first game scene at step S302 includes the following operations: a target editing mode is determined in response to a selection operation for an editing mode. The first game scene is edited based on the target editing mode to obtain scene editing information.

In the present embodiment, the first client may be in different editing modes, a target editing mode may be selected from different editing modes in response to a selection operation for the editing mode, and the editing mode in which the first client is currently located is switched to the target editing mode. The target editing mode may be used for indicating the authority of the first client editing the game scene, so that the first client edits the first game scene in the target editing mode, determines a generated operation information and the editing content as the scene editing information, and further sends the scene editing information to the server.

As an optional implementation method, the target editing mode includes at least one of the following: a short-range editing mode, used for editing at least one object in the first game scene distant from a virtual camera corresponding to the first clientless than a preset first distance; a long-range editing mode, used for editing at least one object in the first game scene distant from a virtual camera corresponding to the first clientless than a preset second distance, wherein the preset second distance is greater than the preset first distance; a global parameter editing mode, used for editing at least one global parameter of the first game scene; and a browsing mode, used for prohibiting editing of the at least one object in the first game scene.

In the present embodiment, when the first client is in the short-range editing mode, the first client may edit the at least one object distant from a corresponding virtual camera by less than a preset first distance in the first game scene. The distance from the corresponding virtual camera less than the preset first distance is a distance away from the vicinity in a view cone of the virtual camera corresponding to the first client. For example, the first client may edit the at least one object within a certain distance in the vicinity of the view cone to generate scene editing information.

When the first client is in the long-range editing mode, the first client may edit the at least one object distant from a corresponding virtual camera less than the preset second distance in the first game scene so as to generate the scene editing information. The distance from the corresponding virtual camera less than the preset second distance is a distance away from the view cone of the virtual camera corresponding to the first client. For example, the first client may edit at least one long-range object such as a sky box of a remote scene which can be seen, so as to generate the scene editing information. It should be noted that the long-range editing mode of the present embodiment is not only capable of editing at least one remote objects, but also capable of editing at least one long-range objects in addition to at least one short-range objects.

When the first client is in the global parameter editing mode, the first client may edit at least one global parameter of the first game scene, and the first client may modify at least one variable of the at least one global parameter of the game scene, such as at least one light direction of the game scene, at least one intensity of light, and at least one global baking parameter.

When the first client is in the browsing mode, the first client cannot edit the at least one object in the first game scene, but the first client may acquire position information of virtual cameras corresponding to other clients synchronized by the server, and may display the first game scene of the other clients under a corresponding perspective, so that the editing operation of the other clients can be seen, and a worker can conveniently refer to and learn the game scene edited by other people through the client or methods and skills used for editing the game scene, thereby a foundation for subsequent editing of the game scene is lay, and the efficiency of editing the game scene is improved.

It should be noted that the above modes are adopted in the present embodiment because each client edits the game scene differently in content and points of interest, each client uses different modes when editing, and conflicting operations can be avoided without affecting the development efficiency.

Optionally, when the first game scene is edited based on the target editing mode, the editing method further includes the following steps: at least one target object of the first game scene currently edited by the first client is determined; The at least one target object is set to a locked state, wherein the at least one target object is prohibited from being edited by any client except the first client in the locked state.

In the present embodiment, when the first client is in the target editing mode, for example, in one of the short-range editing mode, the long-range editing mode, and the global parameter editing mode, the at least one target object in the first game scene may be set to a locked state, and the at least one target object may be locked to set the target object to the locked state. After the at least one target object is set to the locked state, no other client can edit the at least one target object in the game scene, so that the other clients can be prevented from modifying the at least one target object by setting the at least one target object to the locked state.

Optionally, the editing method further includes the following step: the locked state of the at least one target object is unlocked by the first client in response to a switching operation of the editing mode or in response to updating of the current game scene.

The first client in the present embodiment may unlock at least one target object locked in addition to locking the at least one target object in the first game scene. Optionally, the at least one target object may be unlocked only if certain unlocking conditions are met. Optionally, the first client may unlock the locked state of the at least one target object in response to a switching operation of the editing mode or in response to updating of the current game scene. For example, the locked state of the at least one target object may be unlocked when the target editing mode of the first client is changed and/or the view cone of the virtual camera corresponding to the first client no longer presents a current game scene screen.

As an optional implementation method, identification information corresponding to the target editing mode is presented on the first client.

In the present embodiment, when the first client is in different editing modes, different identification information may be presented. For example, the identification information may be color information, and different editing modes correspond to different color information, so that different color information may be displayed when the client is in different editing modes.

Optionally, in the present embodiment, when the first client is in different editing modes, a color of the virtual camera corresponding to the first client and a color of the semi-transparent display of the corresponding view cone (whether the display of the view cone can be configured to be turned on or not) are different.

In the present embodiment, a client for editing the game scene may display the first game scene of the other clients synchronized by the server in the editing mode, the identification information is used for determining the editing mode in which each client is in, and then editing a certain function of the game scene by the client specifically is determined. For example, some clients edit long-range part in the current game scene, some clients edit short-range part in the current game scene, some clients edit the at least one global parameter of the current game scene, and other clients simply browse an effect of the current game scene or a production progress of the game scene development project, so that an editing of the game scene is transparent, and the editing efficiency of the game scene is improved.

In the editing game scene of the present embodiment, state information such as displacement rotation scaling information of each object in the game scene may be synchronized to each client for editing the game scene by utilizing a frame synchronization technology, then the scene editing information of the client currently editing the first game scene is synchronized to the server to modify scene data of the current game scene, and then the server distributes the scene data modified to each client, so that the efficiency of developing the same game scene can be improved, the editing of the game scene is no longer a linear process, a development period of the game scene development project is prevented from being shortened by increasing manpower, the technical problem of low efficiency of editing the game scene is solved, and the technical effect of improving the efficiency of editing the game scene is achieved.

An example of a game scene editing method according to the embodiment of the present disclosure is described below in connection with a preferred implementation mode.

In the process of a project development, multiple artists and planners are often involved in editing a game scene simultaneously in order to improve the efficiency of the project development. In the existing game engine, if multiple people edit the game scene at the same time, the problem of resource conflict occurs.

Therefore, typically for the development of the game scene, only one person is allowed to edit at a time. This development mode is very inefficient when the project progress is very urgent. Therefore, there is a need for a collaboration solution that supports multiple people editing the same game scene at the same time.

In the related art, multiple clients edit the same game scene in series, this solution can be developed in a pipeline mode when multiple game scenes exist, and time wasted when one person waits for the other person can be avoided. However, this waiting problem becomes apparent and serious when there is only one game scene. For game in which there is only one game scene, there must be an efficiency problem.

In the related art, a game scene is divided into multiple sub-areas, each client edits one of the sub-areas, and finally all the sub-areas edited are integrated to obtain a final game scene. The editing method seems to enable multiple clients to work on one game scene at the same time, but actually one game scene is divided. One client cannot display the editing progress of the game scene on the other client, so that a worker cannot see the editing progress of the other person in real time to adjust the working content of the worker according to the working content of the other person. That is to say, the above method divides a large game scene into several small game scenes, and finally the several small game scenes need to be merged together. Problems may occur in a process of merging, and a merging operation is implemented differently on different game engines, so that the efficiency is affected. Further, many problems are encountered in repeatedly modifying the current scene.

In the embodiment of the present disclosure, multiple people can edit the same area of the same game scene at the same time, so that the efficiency reduction caused by serial development is avoided, and the problems that multiple sub-areas are divided for editing, errors are easy to occur during merging and timely communication cannot be achieved are also avoided.

In the present embodiment, the displacement rotation scaling information of each object in the game scene may be synchronized to each client through a function of network synchronization, the position information of the virtual camera corresponding to each client is synchronized to other clients, the scene editing information of each client is synchronized to the server, the server modifies the scene data of the current game scene based on the scene editing information, and then the server distributes the scene data modified to other clients editing the game scene. The multiple clients in the present embodiment may simultaneously operate the data of the same game scene, so that each client can be ensured to display the latest game scene at present. Meanwhile, the server periodically backs up the scene data of the current game scene, so that a problem that the working content of the client is completely deleted or the scene data of other clients is inadvertently overwritten due to an inadvertent operation of one client can be avoided.

There are a total of four editing modes that can be set by the client in the present embodiment, including: a browsing mode, a short-range editing mode, a long-range editing mode, and a global parameter editing mode. The client in the present embodiment may freely switch at will between several different editing modes as described above.

When the client is in the browsing mode, any object in the game scene cannot be edited by the client, and the editing operation of the other clients can be seen, so that a client can conveniently refer to and learn the game scene edited by other clients or methods and skills used for editing the game scene.

When the client is in the short-range editing mode, the client may edit an object within a certain distance in the vicinity of a view cone of the current game scene.

When the client is in the long-range editing mode, the client may edit a long-range object such as a sky box remote from the current game scene.

When the client is in the global parameter editing mode, the client may modify at least one variable of the at least one global parameter of the game scene, such as at least one light direction of the game scene, at least one intensity of light, and at least one global baking parameter.

When in the latter three editing modes in the present embodiment, the client may set an editable object to a locked state, thereby the other clients is prevented from modifying the editable object. The editable object in the locked state is unlocked when the client changes the editing mode or the view cone of the camera no longer sees the current game scene. When the editing mode changes, it usually indicates that a modification of the editable object by a worker is finished, so the editable object in the locked state needs to be unlocked, and other clients are allowed to edit.

Optionally, in the present embodiment, a multi-person voice call function may also be introduced to further improve the efficiency of the game scene development and reduce the risk of conflicts through real-time communication.

Figure 4:
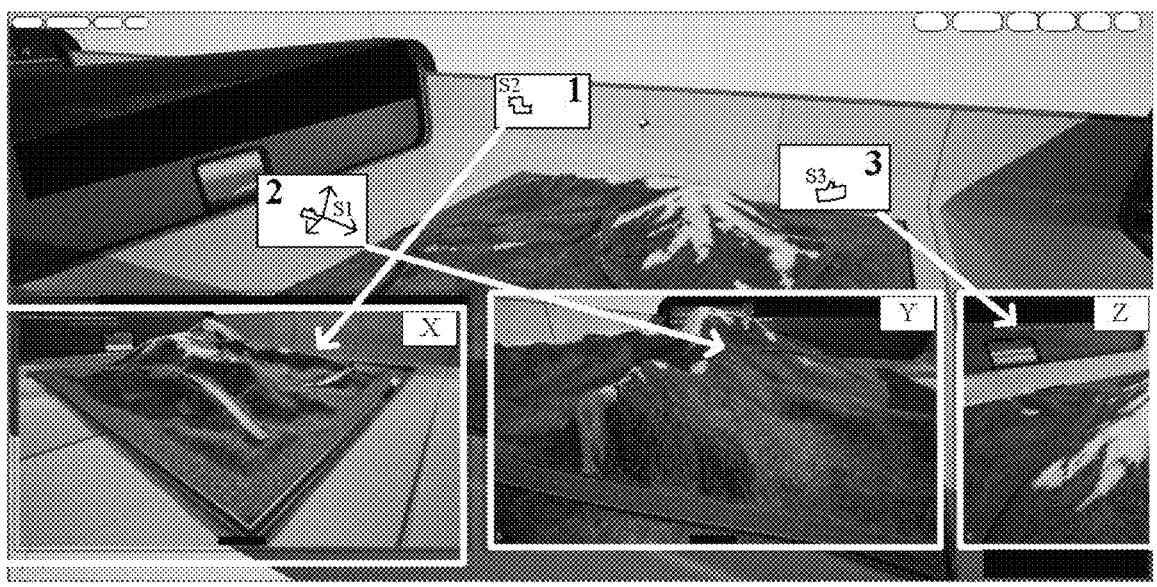
FIG. 4 is a schematic diagram of a presence mode of a virtual camera corresponding to each client and content presented according to one embodiment of the present disclosure.

FIG. 4 is a schematic diagram of a presence mode of a virtual camera corresponding to each client and content presented according to one embodiment of the present disclosure. As shown in FIG. 4, a game scene displayed by client 1 under a corresponding perspective is X, the game scene includes content required to be edited by the client 1, and a virtual camera corresponding to the client 1 is S2. A game scene displayed by client 2 under a corresponding perspective is Y, the game scene includes content required to be edited by the client 2, and a virtual camera corresponding to the client 2 is S1. A game scene displayed by client 3 under a corresponding perspective is Z, the game scene includes content required to be edited by the client 3, and a virtual camera corresponding to the client 3 is S3.

In the present embodiment, when the client is in different editing modes, the color of the virtual camera of the client and the color of the semi-transparent display of the view cone (whether the display of the view cone can be configured to be turned on or not) may be different. Optionally, the color of the virtual camera shown in FIG. 4 and the color of the semi-transparent display of the view cone may be blue. In this way, other scene editors of the client may know who is editing particular functions, some people edit at least one long-range function, some people edit at least one short-range function, some people edit at least one global parameter, some people edit at least one baking parameter, and others simply browse the current scene effect or scene making progress.

The multiple editing modes are adopted by the client in the present embodiment because each client edits differently in content and points of interest, each client uses different editing modes when editing the game scene, and conflicting operations can be avoided without affecting development efficiency.

It should be noted that the reason why the present embodiment adopts a frame synchronization technology instead of a state synchronization technology for scene editing is that there are many calculations related to at least one physical collision during the editing operation of the game scene, and these calculations are relatively large. If these calculations of each client are directly put to the server, a computing pressure of the server is very large. There is also a relatively large delay, so these physical collision related the calculations are put to the client is better, thereby the pressure on the server is relieved.

In the present embodiment, displacement rotation scaling information of each object in the game scene is synchronized to each of the other clients, then scene editing information of each client is synchronized to the server to modify scene data of the current game scene, and then the server distributes the scene data modified to the other clients editing the game scene. The efficiency of developing the same game scene can be improved, the editing of the game scene is no longer a linear process, a development progress and a development mode of supervising a art scene editing can be improved, this method can also be used for teaching, for example, development skills and development ideas of the art scene editing are shared, a development period of the game scene development project is prevented from being shortened by increasing manpower, the technical problem of low efficiency of editing the game scene is solved, and the technical effect of improving the efficiency of editing the game scene is achieved.

An embodiment of the present disclosure also provides a game scene editing apparatus. The apparatus includes at least one processor, and at least one memory for storing a program element. The program element is executed by the at least one processor. The program element may include an acquisition component, an editing component, and a first sending component. It should be noted that the game scene editing apparatus of the present embodiment may be used for performing the game scene editing method of the embodiment of the present disclosure shown in FIG. 2.

Figure 5:
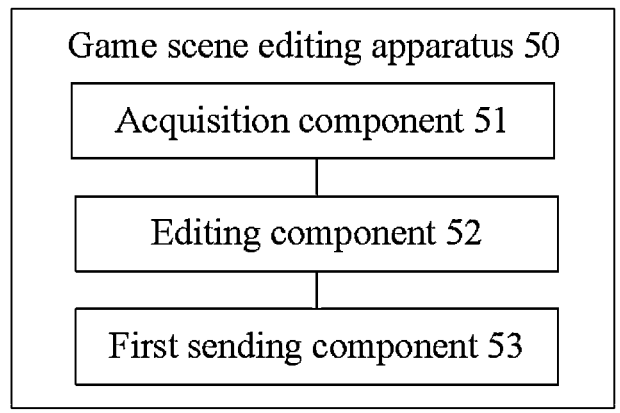
FIG. 5 is a schematic diagram of a game scene editing apparatus according to one embodiment of the present disclosure.

FIG. 5 is a schematic diagram of a game scene editing apparatus according to one embodiment of the present disclosure. As shown in FIG. 5, the game scene editing apparatus 50 includes an acquisition component 51, an editing component 52, and a first sending component 53.

The acquisition component 51 is configured to acquire scene editing information sent by a first client.

The editing component 52 is configured to modify first scene data of a first game scene based on the scene editing information to obtain second scene data, wherein the second scene data is used for updating the first game scene into a second game scene.

The first sending component 53 is configured to send the second scene data to the first client and a second client, to enable the first client and the second client display the second game scene.

It should be noted herein that the acquisition component 51, the editing component 52, and the first sending component 53 may be executed in a terminal as part of the apparatus. The functions implemented by the above components may be executed by the at least one processor in the terminal. The terminal may also be a smart phone (such as an Android phone or an iOS phone), a tablet computer, a palmtop, a Mobile Internet Device (MID), a PAD, or other terminal devices.

An embodiment of the present disclosure also provides another game scene editing apparatus. The apparatus includes at least one processor, and at least one memory for storing a program element. The program element is executed by the processor. The program element may include a second sending component and a receiving component. It should be noted that the game scene editing apparatus of the present embodiment may be used for performing the game scene editing method of the embodiment of the present disclosure shown in FIG. 3.

Figure 6:
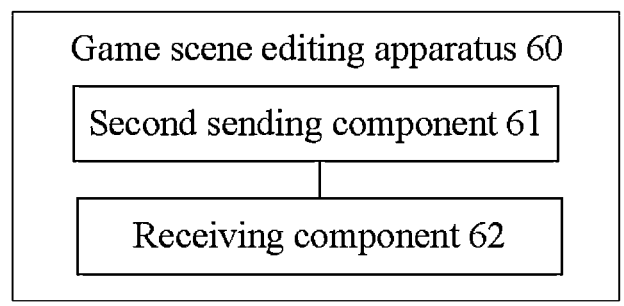
FIG. 6 is a schematic diagram of another game scene editing apparatus according to one embodiment of the present disclosure.

FIG. 6 is a schematic diagram of another game scene editing apparatus according to one embodiment of the present disclosure. As shown in FIG. 6, the game scene editing apparatus 60 may include a second sending component 61 and a receiving component 62.

The second sending component 61 is configured to enable a first client to edit a first game scene and send scene editing information to a server. The scene editing information is used for enabling the server to modify first scene data of the first game scene to obtain second scene data and send the second scene data to at least one client, wherein the at least one client includes the first client and a second client, and the second scene data is used for updating the first game scene into a second game scene.

The receiving component 62 is configured to enable the first client to receive the second scene data sent by the server, and update the displayed first game scene into a second game scene based on the second scene data.

It should be noted herein that the second sending component 61 and the receiving component 62 may be executed in a terminal as part of the apparatus, and the functions implemented by the above components may be executed by the at least one processor in the terminal.

In the present embodiment, the server acquires the scene editing information synchronized by the client, modifies the scene data of the game scene, and then distributes the scene data modified to multiple clients which edit the game scene, so that each client is ensured to present the latest game scene at present, a purpose of simultaneously editing the same scene by multiple people is achieved, time wasted for waiting by editing the game scene in series is avoided, and the problem that the game scene is divided into multiple sub-areas which easily causes merging errors and lack of non-timely communication is also avoided, thereby the technical problem of low efficiency of editing the game scene is solved, and the technical effect of improving the efficiency of editing the game scene is achieved.

An embodiment of the present disclosure also provides a non-transitory storage medium. The non-transitory storage medium stores a computer program that, when executed by a processor, controls a device where the non-transitory storage medium is located to perform the steps in any one of the above method embodiments of the present disclosure.

The various functional components provided by the embodiments of the present application may be executed in a game scene editing apparatus or a similar operational apparatus, or may be stored as part of the non-transitory storage medium.

Figure 7:
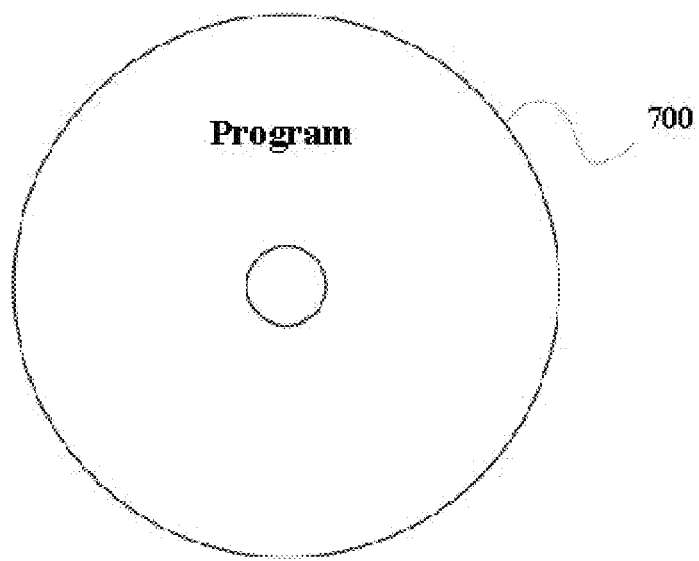
FIG. 7 is a schematic structure diagram of a non-transitory storage medium according to one embodiment of the present disclosure.

FIG. 7 is a schematic structure diagram of a non-transitory storage medium according to one embodiment of the present disclosure. As shown in FIG. 7, a program product 700 according to an implementation method of the present disclosure is described. A computer program is stored in the program product 700. The computer program, when executed by a processor, has a program code implementing the following steps:

scene editing information sent by a first client is acquired;
first scene data of a first game scene is modified based on the scene editing information to obtain second scene data, wherein the second scene data is used for updating the first game scene into a second game scene;
the second scene data is sent to the first client and a second client, to enable the first client and the second client display the second game scene.

Optionally, the computer program, when executed by the processor, also has a program code implementing the following steps: before the scene editing information sent by a first client is acquired, position information of a virtual camera corresponding to the first client is acquired; the position information of the virtual camera corresponding to the first client is sent to the second client, to enable a position of the virtual camera corresponding to the second client to be adjusted to be consistent with a position of the virtual camera corresponding to the first client, wherein a game scene presented by each client is a game scene screen captured by the virtual camera corresponding to each client.

Optionally, the computer program, when executed by the processor, also has a program code implementing the following steps: before the scene editing information sent by a first client is acquired, state information of each object in a current game scene of the first client is acquired, and the state information of each object in the current game scene of the first client is synchronized to the second client.

Optionally, the computer program, when executed by the processor, also has a program code implementing the following steps: After the first scene data of a first game scene based on the scene editing information is modified to obtain second scene data, the second scene data is backed up.

Optionally, the computer program, when executed by the processor, also has a program code implementing the following steps: after the second scene data is sent to the first client and the second client, in response to that the first client updates the second game scene into a third game scene, the backed-up second scene data is sent to the first client and the second client in response to a scene recovery request, to enable the first client and the second client to update the currently displayed third game scene into the second game scene.

Optionally, the computer program, when executed by the processor, also has a program code implementing the following steps: voice information sent by the first client is acquired; the voice information is synchronized to the second client.

As an optional example, the computer program, when executed by the processor, has a program code implementing the following steps:

a first game scene is editing and the scene editing information is sent to a server, wherein the scene editing information is used for enabling the server to modify first scene data of the first game scene to obtain second scene data and send the second scene data to at least one client, and the second scene data is used for updating the first game scene into a second game scene;

the second scene data sent by the server is received, and the displayed first game scene is updated into a second game scene based on the second scene data.

Optionally, the computer program, when executed by the processor, also has a program code implementing the following steps: object data is computed in the first game scene to obtain the scene editing information.

Optionally, the computer program, when executed by the processor, also has a program code implementing the following steps: before the scene editing information is sent to the server, position information of a virtual camera corresponding to the first client is sent to the server, to enable the server to synchronize the position information of the virtual camera corresponding to the first client to the second client, so that the second client adjusts a position of the virtual camera corresponding to the second client to be consistent with a position of the virtual camera corresponding to the first client, wherein a game scene presented by each of the at least one client is a game scene screen captured by the virtual camera corresponding to each of the at least one client.

Optionally, the computer program, when executed by the processor, also has a program code implementing the following steps: after the second scene data sent by the server is received and the displayed first game scene is updated into the second game scene based on the second scene data, in response to that the second game scene is updated into a third game scene, a scene recovery request is sent to the server, wherein the scene recovery request is used for requesting to acquire the backed-up second scene data by the server; the second scene data sent by the server is received, and the displayed third game scene is updated into the second game scene based on the second scene data.

Optionally, the computer program, when executed by the processor, also has a program code implementing the following steps: a target editing mode is determined in response to a selection operation for an editing mode; the first game scene is edited based on the target editing mode to obtain scene editing information.

Optionally, the computer program, when executed by the processor, also has a program code implementing the following steps: when the first game scene is edited based on the target editing mode, at least one target object of the first game scene currently edited by the first client is determined, and the target object is set to a locked state, wherein the at least one target object is prohibited from being edited by any client except the first client in the locked state.

Optionally, the computer program, when executed by the processor, also has a program code implementing the following steps: the locked state of the at least one target object is unlocked in response to a switching operation of the editing mode or in response to updating of the current game scene.

Optionally, the computer program, when executed by the processor, also has a program code implementing the following steps: after the first client determines a target editing mode, identification information corresponding to the target editing mode is presented on the first client.

Optionally, a specific example in the present embodiment may refer to the examples described in the above embodiments, and details are not described herein in the present embodiment.

The non-transitory storage medium may include a data signal that is propagated in a baseband or as part of a carrier, carrying a readable program code. Such propagated data signals may take a variety of forms including, but not limited to, electromagnetic signals, optical signals, or any suitable combination of the foregoing. The non-transitory storage medium may send, propagate, or transmit a program for use by or in connection with an instruction execution system, apparatus, or device.

Program codes included in the non-transitory storage medium may be transmitted by any suitable medium, including but not limited to wireless, wire, optical cable, radio frequency, etc., or any suitable combination of the foregoing.

Optionally, in the present embodiment, the non-transitory storage medium may include, but is not limited to, various media capable of storing a computer program such as a U disk, a Read-Only Memory (ROM), a Random Access Memory (RAM), a mobile hard disk, a magnetic disk, or an optical disc.

An embodiment of the present disclosure also provides an electronic device. The electronic device includes a processor and a memory. The memory is connected to the processor and configured to store an executable instruction of the processor. The processor is configured to execute the executable instruction including: scene editing information sent by a first client is acquired; first scene data of a first game scene is modified based on the scene editing information to obtain second scene data, wherein the second scene data is used for updating the first game scene into a second game scene; and the second scene data is sent to the first client and a second client so that the first client and the second client display the second game scene.

Figure 8:
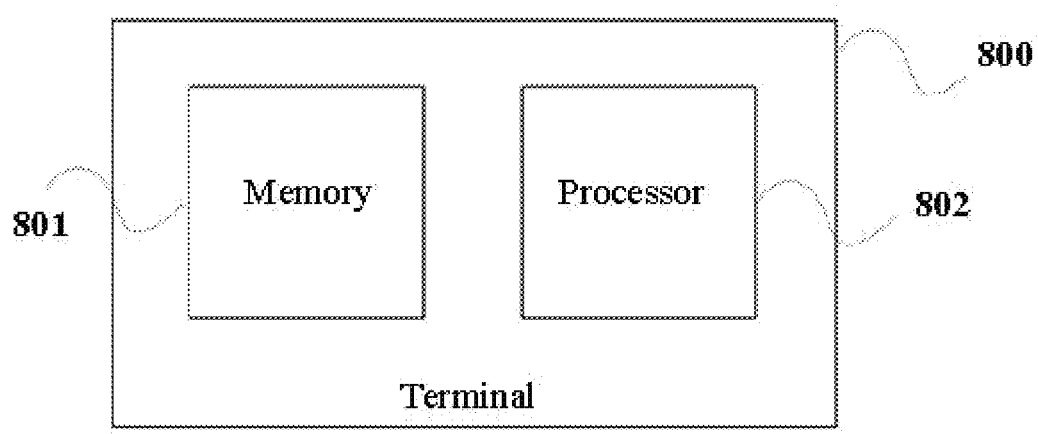
FIG. 8 is a schematic structure diagram of an electronic device according to one embodiment of the present disclosure.

FIG. 8 is a schematic structure diagram of an electronic device according to one embodiment of the present disclosure. As shown in FIG. 8, the electronic device 800 of the present embodiment includes a memory 801 and a processor 802. The memory 801 is configured to store an executable instruction of the processor. The executable instruction may be a computer program. The processor 802 is configured to execute the executable instruction to perform the following steps:

scene editing information sent by a first client is acquired; first scene data of a first game scene is modified based on the scene editing information to obtain second scene data, wherein the second scene data is used for updating the first game scene into a second game scene;

the second scene data is sent to the first client and a second client so that the first client and the second client display the second game scene.

Optionally, the processor 802 is further configured to implement the following steps by executing the executable instruction: before the scene editing information sent by a first client is acquired, position information of a virtual camera corresponding to the first client is acquired; the position information of the virtual camera corresponding to the first client is sent to the second client, to enable a position of the virtual camera corresponding to the second client to be adjusted to be consistent with a position of the virtual camera corresponding to the first client, wherein a game scene presented by each client is a game scene screen captured by the virtual camera corresponding to each client.

Optionally, the processor 802 is further configured to implement the following steps by executing the executable instruction: before the scene editing information sent by a first client is acquired, state information of each object in a current game scene of the first client is acquired, and the state information of each object in the current game scene of the first client is synchronized to the second client.

Optionally, the processor 802 is further configured to implement the following steps by executing the executable instruction: After the first scene data of a first game scene based on the scene editing information is modified to obtain second scene data, the second scene data is backed up.

Optionally, the processor 802 is further configured to implement the following steps by executing the executable instruction: after the second scene data is sent to the first client and the second client, in response to that that the first client updates the second game scene into a third game scene, the backed-up second scene data is sent to the first client and the second client in response to a scene recovery request, to enable the first client and the second client to update the currently displayed third game scene into the second game scene.

Optionally, the processor 802 is further configured to implement the following steps by executing the executable instruction: voice information sent by the first client is acquired; the voice information is synchronized to the second client.

As an optional example, the processor 802 is further configured to implement the following steps by executing the executable instruction:

a first game scene is editing and the scene editing information is sent to a server, wherein the scene editing information is used for enabling the server to modify first scene data of the first game scene to obtain second scene data and send the second scene data to at least one client, and the second scene data is used for updating the first game scene into a second game scene;

the second scene data sent by the server is received, and the displayed first game scene is updated into a second game scene based on the second scene data.

Optionally, the processor 802 is further configured to implement the following steps by executing the executable instruction: object data is computed in the first game scene to obtain the scene editing information.

Optionally, the processor 802 is further configured to implement the following steps by executing the executable instruction: before the scene editing information is sent to the server, position information of a virtual camera corresponding to the first client is sent to the server, to enable the server to synchronize the position information of the virtual camera corresponding to the first client to the second client, so that the second client adjusts a position of the virtual camera corresponding to the second client to be consistent with a position of the virtual camera corresponding to the first client, wherein a game scene presented by each of the at least one client is a game scene screen captured by the virtual camera corresponding to each of the at least one client.

Optionally, the processor 802 is further configured to implement the following steps by executing the executable instruction: after the second scene data sent by the server is received and the displayed first game scene is updated into the second game scene based on the second scene data, in response to that the second game scene is updated into a third game scene, a scene recovery request is sent to the server, wherein the scene recovery request is used for requesting to acquire the backed-up second scene data by the server; the second scene data sent by the server is received, and the displayed third game scene is updated into the second game scene based on the second scene data.

Optionally, the processor 802 is further configured to implement the following steps by executing the executable instruction: a target editing mode is determined in response to a selection operation for an editing mode; the first game scene is edited based on the target editing mode to obtain scene editing information.

Optionally, the processor 802 is further configured to implement the following steps by executing the executable instruction: when the first game scene is edited based on the target editing mode, at least one target object of the first game scene currently edited by the first client is determined, and the target object is set to a locked state, wherein the at least one target object is prohibited from being edited by any client except the first client in the locked state.

Optionally, the processor 802 is further configured to implement the following steps by executing the executable instruction: the locked state of the at least one target object is unlocked in response to a switching operation of the editing mode or in response to updating of the current game scene.

Optionally, the processor 802 is further configured to implement the following steps by executing the executable instruction: after the first client determines a target editing mode, identification information corresponding to the target editing mode is presented on the first client.

Optionally, the electronic device may further include a transmission device and an input/output device, wherein the transmission device is connected to the processor, and the input/output device is connected to the processor.

In an optional implementation mode, the electronic device may further include at least one processor, and a memory resource represented by the memory and configured to store an instruction executable by a processing component, such as an application program. The application program stored in the memory may include at least one module each corresponding to a set of instructions. In addition, the processing component is configured to execute instructions to perform the above game scene editing method.

The electronic device may further include: a power supply component, configured to perform power management on the electronic device; a wired or wireless network interface, configured to connect the electronic device to a network; and an Input/Output (I/O) interface. The electronic device may operate based on an operating system stored in the memory, such as Android, iOS, Windows, Mac OS X, Unix, Linux, or FreeBSD.

It will be understood by those of ordinary skill in the art that the structure shown in FIG. 8 is merely illustrative. The electronic device may be an electronic device such as a smart phone, a tablet computer, a palmtop computer, an MID, or a PAD. FIG. 8 does not limit the structure of the above electronic device. For example, the electronic device may further include more or fewer components (such as a network interface or a display device) than shown in FIG. 8, or has a different configuration from that shown in FIG. 8.

It is apparent that those skilled in the art should understand that the above components or steps of the present disclosure may be implemented by a general-purpose computing device, and they may be centralized on a single computing device or distributed on a network composed of multiple computing devices. Optionally, they may be implemented with program codes executable by a computing device, so that they may be stored in a storage device and executed by the computing device, and in some cases, the steps shown or described may be performed in a different order than here, or they are separately made into individual integrated circuit modules, or multiple modules or steps therein are made into a single integrated circuit module for implementation. As such, the present disclosure is not limited to any particular combination of hardware and software.

The above is only the preferred embodiments of the present disclosure, not intended to limit the present disclosure. As will occur to those skilled in the art, the present disclosure is susceptible to various modifications and changes. Any modifications, equivalent replacements, improvements and the like made within the principle of the present disclosure shall fall within the scope of protection of the present disclosure.

What is claimed is:

1. A game scene editing method, comprising:
acquiring scene editing information sent by a first client, wherein the first client is a client editing a current first game scene in a game scene development process;
modifying first scene data of the first game scene based on the scene editing information to obtain second scene data, wherein the first scene data is configured for generating the first game scene and comprises at least one of: a terrain parameter, a light direction parameter, a light intensity parameter, a model parameter, or a baking parameter, and the second scene data is configured for updating the first game scene into a second game scene; and
sending the second scene data to the first client and a second client, to enable the first client and the second client to display the second game scene.

2. The editing method as claimed in claim 1, wherein the scene editing information is obtained through computing, by the first client, object data in the first game scene.

3. The editing method as claimed in claim 1, wherein before acquiring the scene editing information sent by the first client, the method further comprises:
acquiring position information of a virtual camera corresponding to the first client; and
sending the position information of the virtual camera corresponding to the first client to the second client, to enable a position of the virtual camera corresponding to the second client to be adjusted to be consistent with a position of the virtual camera corresponding to the first client, wherein a game scene presented by each client is a game scene screen captured by the virtual camera corresponding to each client.

4. The editing method as claimed in claim 1, wherein before acquiring the scene editing information sent by the first client, the method further comprises:
   acquiring state information of each object in a current game scene of the first client; and
   synchronizing the state information of each object in the current game scene of the first client to the second client.

5. The editing method as claimed in claim 1, wherein after modifying the first scene data of the first game scene based on the scene editing information to obtain the second scene data, the method further comprises:
   backing up the second scene data.

6. The editing method as claimed in claim 5, wherein after sending the second scene data to the first client and the second client, the method further comprises:
   under the condition that the second game scene is updated into a third game scene, sending the backed-up second scene data to the first client and the second client in response to a scene recovery request, to enable the first client and the second client to update the currently displayed third game scene into the second game scene.

7. The editing method as claimed in claim 1, wherein the scene editing information is sent by the first client under a target editing mode.

8. The editing method as claimed in claim 7, wherein the target editing mode comprises at least one of the following:
   a short-range editing mode, configured for editing at least one object in the first game scene distant from a virtual camera corresponding to the first client less than a preset first distance;
   a long-range editing mode, configured for editing at least one object in the first game scene distant from a virtual camera corresponding to the first client less than a preset second distance, wherein the preset second distance is greater than the preset first distance; and
   a global parameter editing mode, configured for editing at least one global parameter of the first game scene.

9. The editing method as claimed in claim 1, further comprising:
   acquiring voice information sent by the first client; and
   synchronizing the voice information to the second client.

10. A game scene editing method, comprising:
    editing, by a first client, a current first game scene in a game scene development process, and sending, by the first client, scene editing information to a server, wherein the scene editing information is configured for enabling the server to modify first scene data of the first game scene to obtain second scene data and send the second scene data to at least one client, wherein the first scene data is configured for generating the first game scene and comprises at least one of: a terrain parameter, a light direction parameter, a light intensity parameter, a model parameter, or a baking parameter, and the at least one client includes the first client and a second client, and the second scene data is configured for updating the first game scene into a second game scene; and
    receiving, by the first client, the second scene data sent by the server, and updating, by the first client, the displayed first game scene into a second game scene based on the second scene data.

11. The editing method as claimed in claim 10, wherein editing, by the first client, the first game scene comprises:
    computing, by the first client, object data in the first game scene to obtain the scene editing information.

12. The editing method as claimed in claim 10, wherein before sending, by the first client, the scene editing information to the server, the method further comprises:
    sending, by the first client, position information of a virtual camera corresponding to the first client to the server, to enable the server to synchronize the position information of the virtual camera corresponding to the first client to the second client, so that the second client adjusts a position of the virtual camera corresponding to the second client to be consistent with a position of the virtual camera corresponding to the first client,
    wherein a game scene presented by each of the at least one client is a game scene screen captured by the virtual camera corresponding to each of the at least one client.

13. The editing method as claimed in claim 10, wherein after receiving, by the first client, the second scene data sent by the server and updating the displayed first game scene into the second game scene based on the second scene data, the method further comprises:
    in response to that the first client updates the second game scene into a third game scene, sending a scene recovery request to the server, wherein the scene recovery request is configured for requesting to acquire the second scene data backed up by the server; and
    receiving, by the first client, the second scene data sent by the server, and updating, by the first client, the displayed third game scene into the second game scene based on the second scene data.

14. The editing method as claimed in claim 10, wherein editing, by the first client, the first game scene comprises:
    determining, by the first client, a target editing mode in response to a selection operation for an editing mode; and
    editing, by the first client, the first game scene based on the target editing mode to obtain scene editing information.

15. The editing method as claimed in claim 14, wherein the target editing mode comprises at least one of the following:
    a short-range editing mode, configured for editing at least one object in the first game scene distant from a virtual camera corresponding to the first client less than a preset first distance;
    a long-range editing mode, configured for editing at least one object in the first game scene distant from a virtual camera corresponding to the first client less than a preset second distance, wherein the preset second distance is greater than the preset first distance;
    a global parameter editing mode, configured for editing at least one global parameter of the first game scene; and
    a browsing mode, configured for prohibiting editing of the at least one object in the first game scene.

16. The editing method as claimed in claim 14, wherein when editing, by the first client, the first game scene based on the target editing mode, the method further comprises:
    determining, by the first client, at least one target object of the first game scene currently edited by the first client, and setting, by the first client, the at least one target object to a locked state, wherein the at least one target object is prohibited from being edited by any client except the first client in the locked state.

17. The editing method as claimed in claim 16, further comprising:
    unlocking, by the first client, the locked state of the at least one target object in response to a switching operation of the editing mode or in response to updating of the current game scene.

18. The editing method as claimed in claim 15, wherein after determining, by the first client, a target editing mode, the method further comprises:
presenting identification information corresponding to the target editing mode on the first client.

19. A non-transitory storage medium, storing a computer program that, when executed by a processor, controls a device where the storage medium is located to perform the following steps:
editing a first game scene and sending scene editing information to a server, wherein the scene editing information is configured for enabling the server to modify first scene data of the first game scene to obtain second scene data and send the second scene data to at least one client, the first game scene is currently edited by the device in a game scene development process, the first scene data is configured for generating the first game scene and comprises at least one of: a terrain parameter, a light direction parameter, a light intensity parameter, a model parameter, or a baking parameter, and the second scene data is configured for updating the first game scene into a second game scene; and receiving the second scene data sent by the server, and updating the displayed first game scene into a second game scene based on the second scene data.

20. An electronic device, comprising a memory and a processor, wherein the memory stores a computer program, and the processor is configured to execute the computer program to perform the following steps:
editing a first game scene and sending scene editing information to a server, wherein the scene editing information is configured for enabling the server to modify first scene data of the first game scene to obtain second scene data and send the second scene data to at least one client, the first game scene is currently edited by the electronic device in a game scene development process, the first scene data is configured for generating the first game scene and comprises at least one of: a terrain parameter, a light direction parameter, a light intensity parameter, a model parameter, or a baking parameter, and the second scene data is configured for updating the first game scene into a second game scene; and
receiving the second scene data sent by the server, and updating the displayed first game scene into a second game scene based on the second scene data.

* * * * *